United States Patent [19]

Woods

[11] Patent Number: 4,971,278
[45] Date of Patent: Nov. 20, 1990

[54] PONY SHOE REFRIGERATOR MAGNET

[76] Inventor: Stephanie C. Woods, P.O. Box 45, Placerville, Calif. 95667

[21] Appl. No.: 416,043

[22] Filed: Oct. 2, 1989

[51] Int. Cl.$^5$ .................................................. F16B 47/00
[52] U.S. Cl. ................................. 248/206.5; 248/309.4; 248/684
[58] Field of Search ................. 248/206.5, 467, 309.4, 248/684; 211/89, DIG. 1; 24/303

[56] References Cited

U.S. PATENT DOCUMENTS

| | | | |
|---|---|---|---|
| 2,246,269 | 6/1941 | Sorenson | 211/DIG. 1 X |
| 2,693,370 | 11/1954 | Wheatley | 24/303 X |
| 2,798,241 | 7/1957 | Cohen | 248/683 |
| 2,855,242 | 10/1958 | Holmes | 211/DIG. 1 |
| 3,472,391 | 10/1969 | Bolognesi | 248/683 X |
| 4,527,311 | 7/1985 | Aoki | 24/303 |
| 4,830,321 | 5/1989 | Irie | 248/206.5 |

*Primary Examiner*—Alvin C. Chin-Shue
*Attorney, Agent, or Firm*—Marvin H. Kleinberg

[57] ABSTRACT

A holding device includes a lever arm, a magnetic fulcrum and a frictional member which is held against a magnetizable surface with the frictional member normally in contact with the surface. Pivoting the lever arm about the fulcrum raises the frictional member out of contact with the surface so that objects can be securely placed under the lever arm. Releasing the free end of the lever arm causes the holding end to return to the magnetizable surface, securely holding any objects placed therebetween against the magnetizable surface.

1 Claim, 1 Drawing Sheet

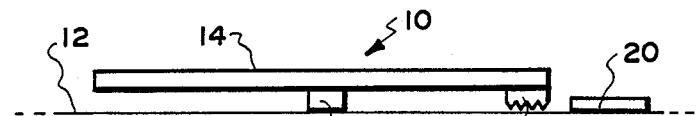
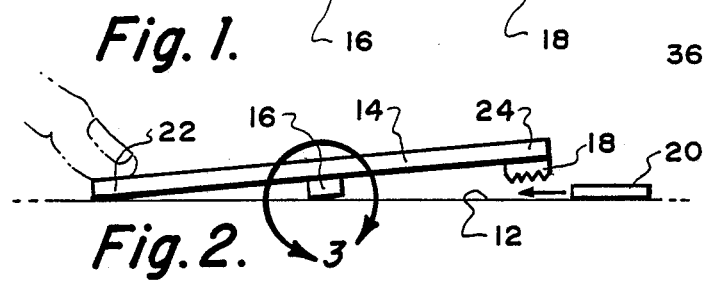
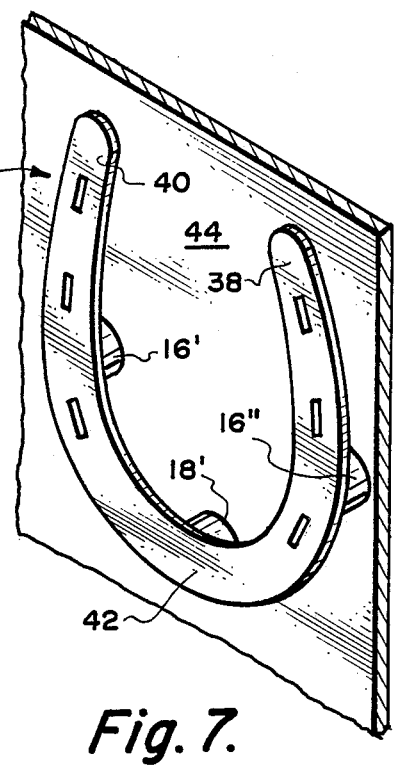
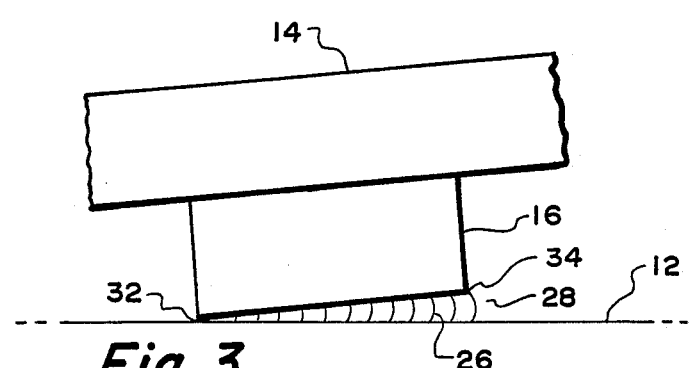
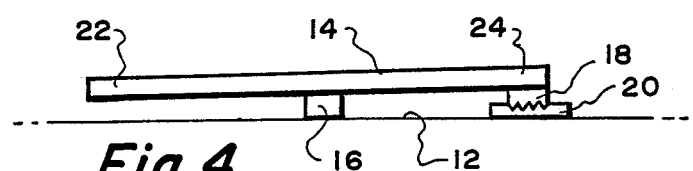
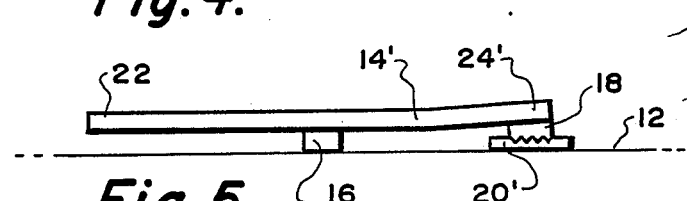
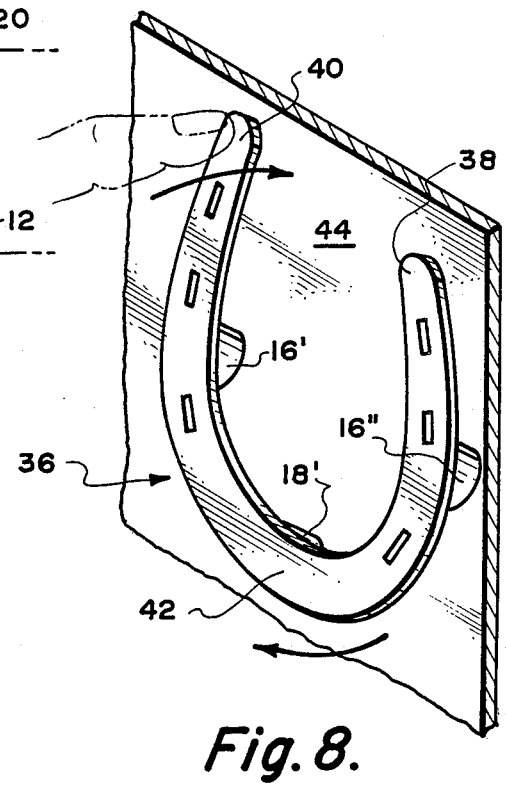
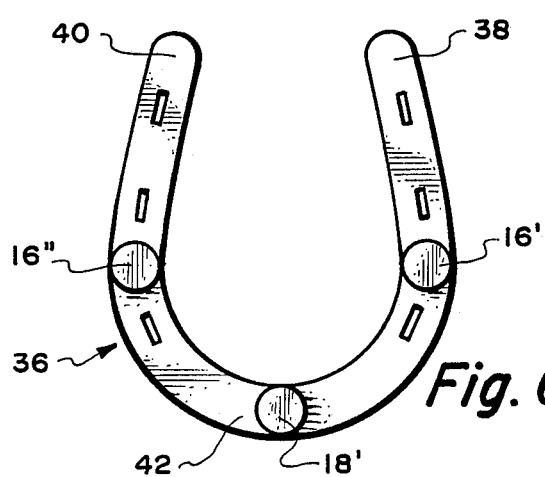

PONY SHOE REFRIGERATOR MAGNET

BACKGROUND OF THE INVENTION

The present invention is concerned with magnets and other types of devices used to adhere papers and other substantially flat, lightweight objects to magnetically attractive surfaces. Typically, magnets are used to adhere papers to refrigerators or other vertical surfaces such as metal cabinets, thus allowing such surfaces to be used as a "bulletin board" or "memo pad."

The most basic method of adhering papers to a magnetically attractive surface, such as a metal filing cabinet or refrigerator side or door, or other, similar magnetizable surface is a simple magnet. Depending on the size and strength of the magnet, however, there is a limit to the size and number of papers that can be adhered. The thickness of the object to be held is often a consideration, as well. Additional magnets can be used to adhere either a greater number of papers or larger pieces of paper. However, the use of more than one magnet is often inconvenient and cumbersome.

Another common method of adhering papers to a magnetically attractive surface employs an integral device, such as a "clip" with a magnet attached to the back of the clip. The papers are placed within the clip, which is usually spring activated, and a magnet is attached to the back of the clip adhering the clip to the magnetically attractive surface.

However, the constant opening and closing of the clip can cause the magnet to slide across the surface. This motion could be mitigated if the magnetic force was utilized as the restoring force for the "spring action" of the device. What is needed then, is an integral device where the magnet acts both to adhere the device to the surface, and as the restoring force for the "spring action" of the device.

SUMMARY OF THE INVENTION

An object of the present invention is to provide a simple, integral device, with few moving parts, for frictionally holding objects against a magnetically attractive, substantially vertical surface.

In general, the present invention is embodied in a lever arm with a magnetic fulcrum. The magnetic fulcrum adheres the device to a magnetically attractive surface and acts as a pivoting point around which the lever arm rotates. The first or "free" end of the lever arm is pressed against the surface so as to allow the second or "holding" end to rotate away from the surface. Objects, such as paper, are placed beneath the holding end. Releasing the free end of the lever arm allows the holding end to rotate back to the surface where it holds the object against the surface. The holding end also has frictional material attached to it to aid it in holding the objects against the surface.

The lever arm can be composed of either rigid or flexible material, as desired. If a flexible material is used, more papers can be placed under the holding end and the "spring like" quality of the flexible lever arm itself assists in holding the papers against the surface. In fact, if the holding power of the magnet is sufficient, then for all intents and purposes, the lever can be considered adhered to the surface and all holding power can come from the spring arm restoring force.

The invention is also embodied in an integral "u" shaped device. In this embodiment, the vertex of the "u" is the "holding end and the "legs" of the "u" comprise a pair of free ends, either one of which can be pressed to release the holding end. A horseshoe, especially a pony shoe, works well in this embodiment because it is a magnetizable material and the magnetic fulcrum could be attached to the horseshoe without additional adhesive.

Further embodiments use additional magnets at the "holding end", which increases the holding force at the end and which gives the lever member or members greater adherence to the surface. Additionally the lengths of the lever arms can also be varied to provide for a greater or lesser restoring force.

BRIEF DESCRIPTION OF THE DRAWINGS

FIG. 1 is a cross-sectional side view of the device of the present invention in a stable configuration;

FIG. 2 is a cross-sectional view similar of the device of FIG. 1 rotated for placement of an object under the holding end;

FIG. 3 is an enlarged, close-up view of the circled portion of the device of FIG. 2, with the magnetic flux lines indicated;

FIG. 4 is a cross-sectional view of the device of FIG. 2 restored to its stable position with an object secure under its holding end;

FIG. 5 is a cross-sectional view of an alternative embodiment of the present invention utilizing a flexible lever arm material;

FIG. 6 is a front view of a "u" shaped embodiment of the present invention;

FIG. 7 is a perspective view of the embodiment of FIG. 6; and

FIG. 8 is a view similar to FIG. 7 with the vertex end of the device rotated for placement of objects beneath it.

DESCRIPTION OF THE PREFERRED EMBODIMENTS

The holding device of the present invention 10 is shown in various positions in FIGS. 1, 2, and 4. FIG. 1 shows the device 10 in a stable configuration against magnetically attractive surface 12. The device 10 is comprised of a lever arm 14, a magnetic fulcrum element 16, and a frictional element 18.

The magnetic fulcrum element 16 is fastened to lever member 14 either through the use of an adhesive, or by constructing lever arm 14 out of a magnetically attractive or magnetizable material. Thus the fulcrum member 16 has magnetic characteristics sufficient to adhere the device 10 to the surface 12.

A frictional member 18 is attached to one end of the lever arm 14 to assist in holding an object 20 such as a photograph, drawing or memorandum against the surface 12. While the lever arm 14 is shown as substantially parallel to the surface 12, it is also possible to impart a curve to the arm so that the holding end is normally in contact with the surface 12. In such an arrangement, a frictional member would be unnecessary. Moreover, the presence of any material having thickness would tend to lift the fulcrum member 16 away from the surface, against the magnetic restoring force which attempts to resist such lifting.

FIG. 2 illustrates the rotation of the lever arm 14 around the pivoting fulcrum member 16 so as to allow the object 20 to be placed beneath the frictional member 18. Force is exerted at the free end 22 of the lever arm 14, pivoting the fulcrum member 16, and displacing the holding end 24 of the lever member far enough away from the surface 12 to allow the object 20 to be placed beneath the holding end 24.

FIG. 3 is a close-up view of the fulcrum member 16 being pivoted against the surface 12. Magnetic lines of flux 26 are indicated showing the magnetic attracting forces between the fulcrum member 16 and the magnetizable surface 12 which draws the fulcrum member 16 to the surface 12.

As discussed above, the force against the free end 22 of the lever member 14 causes the fulcrum member 16 to pivot against the surface 12. A magnetic field, as indicated by the flux lines 26, exists in the gap 28 between the fulcrum member 16 and the surface 12.

All along the fulcrum member 16, there is a substantial magnetic "restoring" force along the flux lines 26 which seeks to close the gap 28. This force varies in inverse proportion to the cube of the distance between each point on the surface of the fulcrum member 16 and a corresponding point on the surface 12. The force is thus significantly greater at the pivot point 32 than at the free point 34. However, since a significant portion of the mass of the fulcrum member 16 is closer to the pivot point 32 than to the free point 34, the restoring force is powerful, and as the free point 34 draws closer to the surface 12, the restoring force increases nonlinearly.

Returning to FIG. 2, we note that a constant force is needed at free end 22 to keep the fulcrum member 16 pivoted. By placing the object 20 beneath holding end 24 and releasing the free end 22, the lever arm is magnetically attracted towards its original position. As seen in FIG. 4, the object is now securely held by the frictional member 18 between holding end 24 and the surface 12.

What is provided by the present invention is an integral device which is secure and stable. The magnetic fulcrum member 16 can hold the device 10 securely against a substantially vertical surface 12. It also allows the lever arm 14 to be pivoted so that object 20 can be placed under the holding end 24 of lever arm without removing the device 10 from the surface 12.

The frictional member 18 at the underside of the holding end 24 is in lieu of a modification of the shape of the lever which would result in the free end bearing against the surface 12 when the fulcrum member 16 is securely held against the surface 12.

Thus, with a simple pivoting motion, objects can be stored and removed from the device. Also, if the size of the device 10 and the strength of the magnetic fulcrum member 16 are sufficient, the device 10 will tend not to slide along the surface 12, even if the surface is smooth and vertical.

FIG. 5 illustrates an alternative embodiment, wherein a flexible lever member 14, is used. In this embodiment, the lever arm 14, is composed of a springy material such that a sufficiently large object 20, will slightly bend holding end 24'. Holding end 24' will then exert a force against an object 20'. This force, which is merely the spring-like restoring force of holding end 24', can add to the magnetic restoring force of fulcrum member 16. The combined forces thus work together to keep object 20', securely against surface 12. If, however, the magnetic attraction between the fulcrum member 16 and the surface 12 is sufficiently great, the entire holding force can come from the restoring forces of the deformed spring element.

In a preferred embodiment, illustrated in FIG. 6, a "u" shaped, or horseshoe member 36 is utilized. In this embodiment, a pony shoe is used because of its smaller size and lighter mass. In addition, many people have an affinity for horses and ponies and the horseshoe has long been considered an icon of luck and good fortune.

The horseshoe member 36 has three magnetic members 16', 16" and 18'. Fulcrum magnetic members 16, and 16' are placed in alignment intermediate the longitudinal portions 38 and 40 or "arms" of horseshoe member 36 and the apex or "toe" portion 42. The magnetic member 18, is placed at the apex or toe portion 42. In this embodiment the magnetic member 18' also functions as a frictional holding element similar to frictional element 18 of the earlier embodiments.

The operation of the device of FIG. 6 is illustrated in FIGS. 7 and 8. FIG. 7 shows the pony shoe 36 attached to a vertical surface 44. FIG. 8 illustrates the pony shoe 36 after the toe portion 42 has been rotated away from surface 44. This embodiment operates similarly to the previous embodiments, considering the additional mass of the pony shoe. By applying a force to the end of either one of the heel or longitudinal portions 38, 40, in this case longitudinal portion 40 the device is pivoted around magnetic members 16' and 16" and the toe or holding portion 42 is lifted away from the surface 44. When the force is removed from the end of longitudinal portion 40, the magnetic forces acting upon the fulcrum magnets 16',16" rotate them back to a stable position parallel to the surface, bringing the toe portion 42 back to the surface 44, where it will secure any object placed beneath it.

The present embodiments of this invention are thus to be considered in all respects as illustrative and not restrictive; the scope of invention being indicated by the appended claims rather than the foregoing description. All changes which come within the meaning and range of equivalency of the claims are intended to be embraced therein.

What is claimed is:

1. An apparatus for magnetically holding objects to a magnetizable surface comprising:
   (a) an adhering member having a topside and an underside comprised of two longitudinal members connected by a vertex portion;
   (b) a frictional member attached to the underside of said adhering member vertex portion to hold objects placed under said vertex member against the surface; and
   (c) a pair of magnetic members having edges, each fastened to the underside of a said longitudinal member at a point remote from said vertex portion for magnetically adhering said longitudinal members to the surface and positioned to provide a fulcrum axis at one edge of said magnetic members around which said longitudinal members rotate to engage and disengage said frictional member from the surface.
   (d) said frictional member includes a third magnetic member, and said adhering member is an integral "u" shaped member in the form of a horseshoe and comprised of a magnetizable material, and said longitudinal members comprise the arms of the "u".

* * * * *